United States Patent

[11] 3,547,355

[72] Inventor Eliazar R. Salazar
 Garden Grove, Calif.
[21] Appl. No. 793,792
[22] Filed Jan. 24, 1969
[45] Patented Dec. 15, 1970
[73] Assignee Salco Products Incorporated
 Los Angeles, Calif.
 a corporation of California

[54] EMITTER VALVE FOR SOIL IRRIGATION
 18 Claims, 3 Drawing Figs.
[52] U.S. Cl. ............................................. 239/547,
 239/570, 239/602; 47/48.5; 137/525
[51] Int. Cl. ....................................................... B05b 15/00
[50] Field of Search............................................. 239/534,
 542, 547, 569, 570, 546, 571, 572, 602; 47/48.5;
 137/79, 525; 138/45

[56] References Cited
 UNITED STATES PATENTS
| 1,515,998 | | Clark | 137/525 |
| 2,533,191 | 12/1950 | Jaeger | 239/534X |
| 3,046,747 | | Timpe | 47/48.5X |
| 3,139,114 | | Benzel | 138/45X |
| 3,297,260 | 1/1967 | Barlow | 239/534X |

FOREIGN PATENTS
| 1,205,405 | 11/1965 | Germany | |

Primary Examiner—M. Henson Wood, Jr.
Assistant Examiner—Michael Y. Mar
Attorney—Harry Kotlar and Lewis B. Sternfels ABSTRACT: The emitter valve, which is useful for irrigation of soil, includes a valve body placed intermediate the ends of a supply conduit and provided with a valve head. The head has an inlet connected to the supply conduit and one or more outlets opening to the valve exterior for supply of water to the soil. A cylindrical cavity is formed in the head. A deformable ball is housed in the valve head within the cavity and rests against the inlet. The cavity is threaded to receive an adjustable set screw which exerts a pressure against the ball and causes the ball to bear against the inlet. The amount of water released by the valve is determined by the pressure in the conduit which overcomes the applied pressure of the set screw in order to deform the ball and to allow water to pass to the soil.

PATENTED DEC 15 1970　　　　　　　　　　　3,547,355
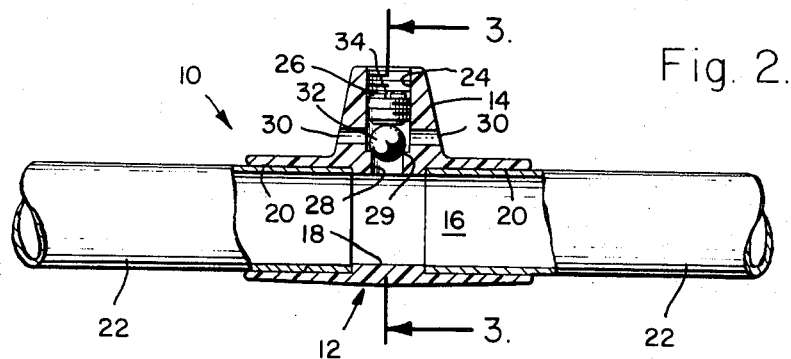
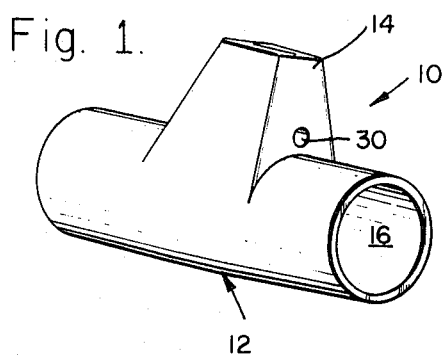
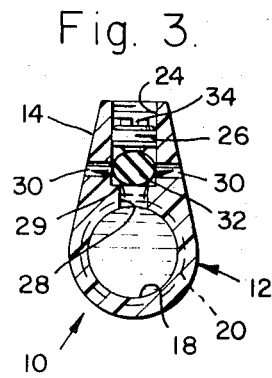
Eliazar R. Salazar,
INVENTOR.
BY
ATTORNEY.

EMITTER VALVE FOR SOIL IRRIGATION

The present invention relates to a soil irrigation apparatus and, more particularly, to an emitter valve therefor.

Irrigation of soil is an age-old art wherein it is desired to maintain the moisture content of the soil at levels needed by the type of vegetation growing therein. It has also been the aim of prior systems to add to or replenish the soil with various minerals and other nutrients to assure maximum health and proper growth of the vegetation.

The general rule applied with regard to conventional irrigation systems is simply to furnish the plants with water without regard to their exact moisture requirements or to economy of use of water. In many cases, this common practice has degraded the quality of the soil. For example, in desert climates where the soil generally has a large water absorption capability because of the consistently high temperatures and large exposure to the sun, evaporation into the atmosphere and absorption into the soil has required the use of extremely large quantities of water in order to furnish a relatively small amount of water to and required by the plant The majority of water in these conditions filters or percolates through the soil more rapidly than can be used by the plant. This filtration also deleteriously causes salts and other minerals to remain in the soil. Evaporation additionally produces the same result and this residue of salts eventually prevents the growth of many forms of vegetation. It has been estimated, for example, that the Colorado River contains 2 tons of salts per acre-foot and these salts have seriously polluted the soil, preventing the fullest and most economic use of the soil and the use of the soil for high yield crops.

In addition, where large volume watering has been undertaken constantly for many years, the water level has actually been raised even in deserts so that the salt level is sufficiently close to the plants to prevent plant growth directly by the salts or indirectly by killing beneficial bacteria which, for example, produce nitrogen needed by the plants.

Because of these problems, such soils at times have been leached, that is, the soil has been washed, in order to drain the salts off into large drainage canals. This leaching method has only met with moderate success and is expensive.

Nonporous soils also experience similar problems and, in addition, water runs off or evaporates into the atmosphere or possibly even rots the plant roots from too much moisture. In such cases, precise metering of water is required.

Prior methods of irrigation have varied from the very old use of wooden planks or bamboo poles to the more modern use of metals and plastics disposed underground as conduits. The major disadvantage of these methods is that the planks or poles soon rot or become clogged with roots, algae, and dirt and even, in the case of bamboo poles, sprout and take root at the knuckles joining the bamboo segments.

In more recent years, metals and plastics have been used for irrigation purposes. One type utilizes spray devices which extend above the surface of the ground from underground piping for sprinkling or "broadcasting" water over the area surrounding the devices. Aside from the problems of acting as obstacles to mowing, harvesting, and other cultivation or gardening techniques, the most serious disadvantage of spray devices is their uneconomic use of water. Excess water either drains from the land or forms pools thereon. On hillsides, this excess water produces seriously eroded soil. In very dry areas, it has been estimated that only 5 percent of the water reaches the plant, 24 percent of the water being lost to the atmosphere before it reaches the ground, 54 percent evaporating from the surface within the next 36 hours, and the remainder too quickly soaking past the roots before the roots can utilize the water.

Prior devices have also been deficient in the proper control of water flow or supply of water. The water pressure may vary downstream from the source or at different elevations of the outlets. The soil textures may differ from a porous sand to a nonporous clay. Some areas of the land may be shaded while others are exposed to the sun. Furthermore, the conduits may become obstructed by foreign matter such as minerals and algae. In one conduit utilizing uncovered holes, the soil tends to clog the holes or even drop within and plug up the piping. Consequently, after some use of such a conduit, areas of the soil are no longer irrigated. Algae grow within the conduit and produce similar problems. Plant roots also tend to grow toward the source of water to envelope the pipe and grow into the holes so as to provide further clogging.

Several attempts have been made to circumvent these problems, such as by covering the holes with ceramics or foamed plastic pads. These attempts have been unsatisfactory, however, because even such coverings tend to become clogged and fouled. Again, the same problems result, although to a lesser degree, as with the uncovered holes. In addition, algae and minerals are not easily removable from the coverings.

Still another method includes the covering of the holes with a protective material, burying the pipe and material in and surrounding it by a bed of gravel or crushed stone above which a layer of soil is placed. Vegetation is then planted. Although this system minimizes clogging of the holes with soil to some extent, there is still some possibility of roots working their way down through the gravel and into the holes. The greatest drawback to the gravel system, however, is its high cost resulting from the use of special materials, the preparation of the soil, and the high cost of labor.

The present invention overcomes these and other irrigation problems by providing an adjustable emitter valve which can be adapted to different and varying porosities of the soil, elevations of the landscape, shade conditions, temperature conditions, and other factors. In general, the present invention comprises a plastic valve body placed intermediate the ends or at the end of a supply conduit and provided with a head having an inlet connected to the supply conduit. One or more outlets extend from the head. A cylindrical cavity in the valve head houses a deformable ball. The ball is adapted to bear against the inlet, the seating pressure of the ball being varied by means of a set screw, thumb screw or the like threadedly engaging the cylindrical cavity.

The ball is relatively deformable with respect to the valve body and its hardness is selected to conform to the climate in which the emitter valve is to be used. For use in colder climates and at low pressures, a lesser hardness is preferred while in a hotter climate and/or at higher pressures, a harder ball is preferred. In addition, for closer correlation of water supply with plant water needs, the ball is so made that it becomes softer upon a rise of temperature to permit a large flow of water to be furnished the soil and becomes harder when the temperature drops to permit a lesser flow of water.

In operation, the amount of water released by the valve is determined by the pressure in the conduit which overcomes the applied pressure of the set screw in order to deform the ball and to allow water to pass to the soil.

It is, therefore, an object of the present invention to provide an emitter valve for irrigation of soil. Another object is the provision of such an emitter valve for furnishing metered amounts of water to the soil.

Another object is to provide an emitter valve for furnishing metered amounts of water to the soil according to varying soil porosity, temperatures, elevations of the soil, and shade conditions.

Another object is the provision of such an emitter valve which is deformable upon application of water supply pressure.

Another object is to provide an emitter valve which is responsive to temperature changes for regulating the supply of water to the soil.

Other aims and objects, as well as a more complete understanding of the present invention, will become apparent from the following explanation of an exemplary embodiment and the accompanying drawings, in which:

FIG. 1 is a perspective view of the emitter valve;

FIG. 2 is a cross-sectional view of the valve of FIG. 1 with segments of a water supply conduit connected to the valve; and FIG. 3 is a cross-sectional view of the valve depicted in FIG. 2 taken along lines 3-3 thereof.

Accordingly, an emitter valve 10 comprises a body 12 and a head 14. The body is provided with a through bore 15 which has a tube abutment section 18 and tube receiving sections 20, the diameter of section 18 being smaller than that of sections 20. If the valve forms the end of a conduit, one section 20 may be replaced by a seal. A supply conduit 22 is received in sections 20 and abuts against section 18, and the wall thickness and diameters of conduit 22 are preferably adjusted so that a smooth uninterrupted internal flow path is created. Supply conduit 22 may be welded or otherwise bonded to the valve body to provide a permanently fixed and watertight seal therewith.

Valve head 14 is provided with a cylindrical cavity 24 which has a threaded opening at one end for reception of a set screw 26 or the like. An inlet 28 of smaller bore than the cavity opens into cavity 24 at one end to form a seat 29 and into bore 16 at the other end. A pair of outlets or orifices 30 extend from cylindrical cavity 24 to the exterior of the head. The outlets preferably are placed slightly above seat 29.

A deformable ball 32 is placed within cavity 24 and is provided with a diameter slightly less than that of cavity 24 and greater than that of inlet 28 so as to bear only against seat 29 at the inlet. The ball preferably does not seal against the sides of the cavity. Set screw 26 bears against ball 32 to provide an adjustable pressure thereagainst. Thus, ball 32, screw 26, and seat 29 act together as a regulator. A slot 34 or similar means is provided in the set screw which may be turned thereby in order to vary the pressure against the ball and to provide a counter pressure against the water in supply conduit 22.

Preferably, valve 10 is fabricated of a hard plastic, such as ABS (acrilonitrite butadine styrene), polyvinyl chloride, and styrene, while ball 32 is fabricated of a relatively soft material, such as a neoprene gum. The ball also includes certain additives to provide it with a particular hardness in order to adapt it to use in a particular climate. For example, the ball is provided with a hardness of Shore 35 for cool and cold climates where the temperatures are not expected to exceed 100° F. and water pressures of less than approximately 20 p.s.i. For hotter climates where the temperature can be expected to exceed 100° F. and/or for pressures exceeding 20 p.s.i., the hardness is approximately Shore 55. These hardness, climate, and pressure parameters are stated only for illustrative purposes in order to indicate the possibility of adapting the present invention to the requirements of the soil, the climate and the vegetation. In hotter climates, it is expected that a larger flow of water would be required than in cooler climates; however, these factors will vary according to the specific needs and it is possible that a hard ball may be required in some cool climates and vice versa.

In addition, to vary the supply of water to plants in accordance with plant needs upon changes in temperature, ball 32 may also be formed of a material which will expand and contract at lesser rates than the material of body 12 and head 14. Thus, a ball may be said to have a thermal stiffness coefficient which is greater than that of the body. This difference in stiffness coefficients is advantageous where valve 10 is used in locations where the daily temperatures may vary to a considerable extent. At low temperatures, the ball will then seat more closely in seat 29 to permit a lesser quantity of water to be delivered to the soil than at higher temperatures. Therefore, less water will be supplied at those temperatures when evaporation is the least and, conversely, more water will be furnished when the temperature is higher and the evaporation rate of water from the soil is correspondingly higher. Other means, such as additional materials, springs, etc., may be utilized between screw 26 and ball 32 to provide a similar function.

To ensure that the ball will not stick in or adhere to seat 29 or head 14, a silicone compound or other lubricant may be applied to the ball.

In operation, the porosity of the soil, the shade and temperature conditions, the elevations at which the valves are to be placed, and the requirements of the plants for water are determined. The ball with the applicable hardness is selected and placed in valve 10. The set screw is then adjusted in each valve emitter for its specific location and for the water pressure to be used in conduit 22. Thereafter, no further handling of the valve is required except in those instances where it may be necessary to flush out the system, at which time it is only necessary to increase the water pressure and further deform the ball. If desired, the valve may also be opened and, after flushing, the set screw is then readjusted to its former position. Water from conduit 22 bears against ball 32 and seeps past the ball and out through outlets 30 for supply to the soil.

Although the invention has been described with references to a particular embodiment thereof, it should be realized that various changes and modifications may be made therein without departing from the spirit and scope of the invention.

I claim:

1. An emitter valve for the supply of controlled amounts of water under pressure from a source of water to soil in an irrigation system comprising a substantially opened-ended body having through bore means and a fluid emission and control head:

said bore means connected to the source of water and comprising tube receiving sections and a tube abutment section intermediate said tube receiving sections; and said fluid emission and control head comprising outlet means opening to the exterior of said body, an inlet opening into said bore means for reception of the water under pressure, and regulator means connecting said outlet means and said inlet;

said regulator means comprising a seat terminating said inlet, a deformable ball positioned on said seat and exerting a pressure counteracting the pressure of the water, and a screw threadedly engaged within said head and bearing against said ball to adjust the pressure of said ball whereby the pressure of said ball and the pressure of the water are so balanced as to permit the supply of controlled amounts of water.

2. An emitter valve as in claim 1 wherein said body is relatively hard with respect to said ball.

3. An emitter valve as in claim 1 wherein said ball has a thermal stiffness coefficient greater than that of said body.

4. An emitter valve in an irrigation system for supplying controlled amounts of water under pressure from a source of water to soil comprising:

a body having a fluid inlet portion, a fluid outlet portion and a fluid regulator means including a deformable element positioned between said outlet portion and said inlet portion, said inlet portion connected to the source and said outlet portion opening to the soil, said element seated against the terminus of said inlet portion and exerting a counterpressure to the water pressure to permit the supply of controlled amounts of water to the soil.

5. An emitter valve as in claim 4 wherein said deformable element is provided with a thermal stiffness coefficient greater than that of said body.

6. An emitter valve as in claim 4 wherein said fluid inlet portion terminus comprises a seat and said inlet portion includes a bore means and a conduit connected to said bore means, and wherein said deformable element is received in and supported by an enclosure portion of said body larger than said seat, said deformable element being smaller than said enclosure and bearing against said seat.

7. An emitter valve as in claim 6 wherein said regulator means further includes an adjustable fixed element contacting and deforming said deformable element to provide thereby an adjustable pressure on said element for adjusting the supply of the controlled amounts of water.

8. An irrigation system as in claim 4:

wherein said fluid inlet portion includes tube receiving sections and a tube abutment section intermediate said tube receiving sections, said tube abutment section having a diameter less than that of said tube receiving sections; and including tube means connected to the source of water, said tube means having an outer diameter substantially equal to the diameter of said tube receiving sections and an inner diameter substantially equal to the diameter of said intermediate section, said tube means received within said receiving sections and abutting against said intermediate section to provide said inlet portion with a smooth interior.

9. A valve as in claim 4, said element comprising a ball consisting of a neoprene gum.

10. A valve as in claim 4, said element consisting of the combination of a neoprene gum and additives to impart a specified hardness to said element.

11. A valve as in claim 4, said body consisting of an ABS plastic and said element consisting of a neoprene gum.

12. A valve as in claim 4 further including a lubricant applied to said element.

13. A valve as in claim 12 wherein said lubricant consists of a silicone.

14. In an irrigation system, an emitter valve having a housing connected to a source of water under pressure and provided with a fluid outlet, said housing formed of a material having a specified thermal stiffness coefficient and provided with a valve seat and a deformable element disposed on and exerting a pressure against said seat, said deformable element formed of a material having a thermal stiffness coefficient greater than the thermal stiffness coefficient of said housing, to permit the flow of water to be greater at higher temperatures than at lower temperatures.

15. A valve as in claim 14 further including force applying means in and cooperative with said housing and contacting said element for exerting a force against said element 34 and for increasing the pressure of said element against said seat.

16. A valve as in claim 15 wherein said force applying means includes means cooperative with said housing for adjusting the force exerted against said element.

17. An emitter valve for the supply of controlled amounts of water under pressure from a source of water to soil in an irrigation system comprising a fluid emission and control head comprising:

outlet means opening to the exterior of said body, an inlet connected to the source for reception of the water under pressure; and regulator means connecting said outlet means said inlet, said regulator means comprising a deformable element positioned on said inlet and exerting a pressure counteracting the pressure of the water, and means engaged within said head and bearing against said element to adjust the pressure of said element whereby the pressure of said element and the pressure of the water are so balanced as to permit the supply of controlled amounts of water.

18. An emitter valve as in claim 17 further including cavity means in said head positioned between said outlet means and said inlet, said element disposed in said cavity and said cavity means having a dimension slightly larger than said element for support thereof yet permitting the supply of the water.